ǀ United States Patent [19]

Hoff

[11] 4,384,983
[45] May 24, 1983

[54] CATALYST AND PROCESS FOR PRODUCTION OF POLYOLEFINS OF IMPROVED MORPHOLOGY

[75] Inventor: Glen R. Hoff, Naperville, Ill.

[73] Assignee: Standard Oil Company (Indiana), Chicago, Ill.

[21] Appl. No.: 266,640

[22] Filed: May 26, 1981

[51] Int. Cl.$^3$ .............................................. C08F 4/64
[52] U.S. Cl. ................... 252/429 B; 526/114; 526/115; 526/122; 526/125; 526/127; 526/141
[58] Field of Search ..................................... 252/429 B

[56] References Cited

U.S. PATENT DOCUMENTS

| | | | |
|---|---|---|---|
| 3,129,256 | 4/1964 | Hay et al. | 252/429 B X |
| 3,377,326 | 4/1968 | Loveless et al. | 260/80.78 |
| 3,644,318 | 2/1972 | Diedrich et al. | 260/88.2 |
| 3,787,384 | 1/1974 | Stevens et al. | 260/94.9 |
| 3,901,863 | 8/1975 | Berger et al. | 260/88.2 |
| 3,953,414 | 4/1976 | Galli et al. | 526/348 |
| 3,989,880 | 11/1976 | Berger et al. | 526/124 |
| 4,039,472 | 8/1977 | Hoff | 252/429 C |
| 4,104,199 | 8/1978 | Hoff | 252/430 |
| 4,111,835 | 9/1978 | Foschini | 252/429 C |
| 4,130,699 | 12/1978 | Hoff et al. | 526/67 |
| 4,189,557 | 2/1980 | Klaerner et al. | 526/159 |
| 4,190,614 | 2/1980 | Ito et al. | 526/106 |
| 4,199,476 | 4/1980 | Melquist et al. | 252/431 R |
| 4,233,182 | 11/1980 | Hoff et al. | 252/429 C |
| 4,287,093 | 9/1981 | Gilbert | 252/429 B |

*Primary Examiner*—Patrick Garvin
*Attorney, Agent, or Firm*—Stephen L. Hensley; William T. McClain; William H. Magidson

[57] ABSTRACT

Catalyst for production of polyolefins of improved morphology comprises (A) organometallic promoter and (B) reaction product of (1) at least one hydrocarbon-soluble aromatic nitro compound with (2) catalytic complex comprising an intimate association of at least one reduced Group IVB-VB metal halide, at least one divalent metal halide and at least one aluminum compound. Aromatic nitro compound is used in an amount effective to improve polymer morphology without substantial adverse effects on other catalytic properties.

11 Claims, No Drawings

CATALYST AND PROCESS FOR PRODUCTION OF POLYOLEFINS OF IMPROVED MORPHOLOGY

BACKGROUND OF THE INVENTION

This invention relates to improved catalysts for polymerization of alpha-olefins, and more particularly, to catalysts for polymerization of alpha-olefins to products of improved morphology.

It is well known to polymerize alpha-olefins in the presence of catalysts generally comprising an organometallic promoter and a supported catalytic complex comprising an intimate association of reduced Group IVB and/or VB metal halides, divalent metal halides and one or more aluminum compounds. Such complexes typically are prepared by reaction of one or more higher valent Group IVB or VB metal compounds, support materials comprising at least one catalytically inert divalent metal compound, and organoaluminum compounds corresponding to the formula $AlR_nX_{3-n}$, wherein R is hydrocarbyl, X is halogen and $0 < n \leq 3$. Examples of such catalyst components are described in detail in U.S. Pat. No. 3,644,318 (Diedrich et al.), U.S. Pat. No. 3,901,863 (Berger et al.), U.S. Pat. No. 4,199,476 (Melquist et al.) and U.S. Pat. No. 4,233,182 (Hoff et al.), all of which are incorporated herein by reference.

The above-described catalysts typically exhibit sufficiently high activities in polymerization of alpha-olefins that useful products can be obtained without removal of catalyst residues. This, of course, leads to important advantages in terms of process efficiency. However, catalyst performance is not entirely satisfactory from the standpoint of polymer morphology.

While not wishing to be bound by theory, it has been speculated that the small particle size of the supported catalyst complex and/or the tendency of the complex to fragment during polymerization use, e.g., during pumping of catalyst component and/or due to the exothermic polymerization reaction itself, result in relatively high levels of small polymer particles and a relatively broad distribution of polymer particle sizes.

Whatever the cause, production of small polymer particles and polymer of broad particle size distribution are disadvantageous for several reasons. From the standpoint of polymerization process efficiency, high levels of small polymer particles can cause problems because the particles tend to accumulate in, and plug, process lines and filters. From the standpoint of handling and processing of polyolefins, small polymer particles and broad particle size distribution can be disadvantageous because polymer bulk density often is lower than desired and an extrusion and/or pelletization step often is required prior to processing.

In the past, various means for improving polymer particle size have been proposed. One approach has been to prepare supported catalyst complexes using support materials which, due to their size, shape and/or chemical composition, yield complexes that are improved in terms of polymer morphology. See, for example, U.S. Pat. No. 3,787,384 (Stevens et al.)—supported catalyst complexes prepared from silica, alumina or silica-alumina support materials having particle size ranging from 10 to 500 microns; U.S. Pat. No. 3,953,414 (Galli et al.)—spherical or spheroidal supported catalyst complex prepared from hydrated magnesium chloride which has been melted and sprayed into a current of hot nitrogen or air through nozzles having orifices of appropriate diameters; U.S. Pat. No. 4,111,835 (Foschini)—supported catalyst complexes prepared from hydrated Mg chloride in the form of spheroidal particles of 10 to 70 microns; U.S. Pat. No. 4,104,199 (Hoff)—supported catalyst complexes prepared from hydrated Mg stannate support materials; and U.S. Pat. No. 4,233,182 (Hoff et al.)—supported catalyst complexes prepared from support materials which are divalent metal salts of phosphorus acid esters.

A second approach has been to pretreat supported catalyst complexes with minor amounts of alpha-olefins to form encapsulated particles of greater size and resistance to fragmentation. See, for example, U.S. Pat. No. 4,190,614 (Ito et al.).

A third method for improving supported catalyst complexes in terms of polymer morphology involves the use of modifying compounds. Thus, U.S. Pat. No. 4,039,472 (Hoff) discloses treatment of complexes of the type described in the aforesaid U.S. Pat. Nos. 3,644,318 and 3,901,863 with anhydrous HCl to improve polymer morphology. Anhydrous HCl also can be used for purposes of temporary and reversible deactivation of supported catalytic complexes as taught in U.S. Pat. No. 4,130,699 (Hoff et al.).

Among the foregoing methods, the first is somewhat limited in terms of the number of materials that will yield the desired effect as a result of chemical composition and by the cost and complexity of obtaining support material particles of specific shapes and/or sizes. Similarly, alpha-olefin pretreatment is disadvantageous because it can add cost to the overall polymerization process. In addition, encapsulated catalyst complex particles resulting from pretreatment often are more difficult to convey and feed to a reactor than untreated particles.

The use of modifying compounds to improve supported catalyst complexes in terms of polymer morphology is potentially a simple and inexpensive method assuming the existence of effective and easy-to-use modifiers that do not adversely affect catalyst performance, e.g., activity, polymer rheology, to a substantial degree. Anhydrous HCl meets these criteria for the most part though its use is complicated somewhat because it is used as a gas, and accordingly, difficulties may be encountered in metering the precise amounts necessary to attain desirable improvements in morphology while avoiding undesirable agglomeration of particles or other undesirable effects.

From the foregoing, it can be appreciated that there remains a need for improvements in the above-described supported catalyst complexes in terms of polymer morphology. It is an object of this invention to provide such improvements. A further object is to provide supported catalyst components that are improved in terms of polymer morphology but only insubstantially affected in terms of other catalytic properties. A further object of the invention is to provide an improved alpha-olefin polymerization catalyst component and catalyst based thereon, as well as a method for production thereof and for use in polymerization of alpha-olefins. Other objects of the invention will be apparent to persons skilled in the art from the following description and the appended claims.

We have now found that the objects of this invention can be attained by modification of the above-described supported catalyst complexes with appropriate amounts of certain hydrocarbon-soluble aromatic nitro compounds. Advantageously, the modification procedure is simple and does not add substantial cost to the overall polymerization process. Further, as a result of the modification, catalyst complexes are improved in terms of polymer morphology without substantial adverse effects on other properties. In particular, particle size is increased and particle size distribution narrowed such that process efficiency is improved and polymer processing and handling are facilitated.

U.S. Pat. No. 3,377,326 (Loveless et al.) may be of interest with respect to the present invention in disclosing the use of aromatic nitro compounds in olfein polymerization, though such use is for purposes unrelated to improving morphology. Rather, the patentee discloses addition of phosphorus trihalides and oxidants, including nitroaromatics (see Column 3 lines 33–35) to olefin polymerization catalyst made up of vanadium salts and organometallic components for the purpose of increasing activity. Nitrobenzene is specifically disclosed as a suitable oxidant; Example V illustrating addition of the compound and PCl$_3$ to an ongoing ethylenepropylene copolymerization.

In contrast to Loveless et al.'s use of nitroaromatics to increase activity of an unsupported vanadium salt-based catalyst by simple addition of the nitro compound to the remaining catalyst components or preformed catalyst, the present invention involves treatment of a supported, Group IVB and/or VB metal-based catalyst complex with aromatic nitro compound prior to polymerization and prior to formation of the ultimate catalyst. Further, as a result of the treatment according to the present invention, polymer morphology is improved but activity decreases somewhat. This is in direct contrast to Loveless et al.'s use of nitroaromatics to increase activity.

U.S. Pat. No. 4,189,557 (Klaerner et al.) also may be of interest in disclosing that morphology of polyolefins prepared using a catalyst comprising a trialkylaluminum or dialkylaluminum chloride and a component "consisting entirely or substantially of titanium trichloride" can be improved by moistening the titanium trichloride component with a hydrocarbon mixture comprising 100 parts by volume of an alkane hydrocarbon from the pentane, hexane or heptane series and 10 to 1000 parts by volume of a benzene hydrocarbon selected from benzene and certain alkylbenzenes; and subsequently drying the moistened component. However, Klaerner et al. fails to disclose or suggest either the supported catalyst complexes or aromatic nitro compounds used according to the present invention. Further, treatment with aromatic nitro compounds according to this invention involves more than the simple moistening involved in Klaerner et al.

Workers in our laboratories also have found that addition of a nitromesitylene-diethylaluminum chloride reaction product to a catalyst comprising diethylaluminum chloride and an organoaluminum reduced, electron donor-complexed, unsupported titanium trichloride component such as that disclosed in U.S. Pat. Nos. 3,984,350 (Karayannis et al.) or 4,210,738 (Hermans et al.) may result in improvements in the particle size of polypropylene. However, neither extension of such work to catalysts containing supported transition metal-containing complexes, nor treatment of such complexes with hydrocarbon-soluble nitroaromatics according to the present invention was proposed.

DESCRIPTION OF THE INVENTION

Briefly, the improved catalyst component of this invention is a product obtained by contacting a supported catalyst complex comprising an intimate association of at least one reduced Group IVB and/or VB metal halide, at least one divalent metal halide and one or more compounds of aluminum with at least one hydrocarbon-soluble, aromatic nitro compound in an amount and under conditions effective to improve polymer morphology.

In a more specific aspect, the invented catalyst component is a product obtained by contacting (A) a supported catalyst complex which is a reaction product of components comprising (1) at least one higher valent Group IVB and/or VB metal compound, (2) a support material comprising at least one divalent metal compound, and (3) at least one organoaluminum compound corresponding to the formula $AlR_nX_{3-n}$, wherein R is hydrocarbyl, X is halogen and $0<n\leq3$, with (B) at least one hydrocarbon-soluble aromatic nitro compound in an amount and under conditions effective to improve polymer morphology.

In greater detail, the supported catalyst complex that is treated with aromatic nitro compound according to this invention comprises an intimate association of at least one reduced Group IVB and/or VB metal halide, at least one divalent metal halide and at least one compound of aluminum. The supported complex inhibits sufficiently high olefin polymerization activity when combined with organometallic activator that removal of catalyst residues from the polymer is unnecessary. For example, on combination with $Al(C_2H_5)_3$, ethylene polymerization activity is at least about 10,000 grams polyethylene per gram supported complex per hour. For purposes hereof, a reduced Group IVB or VB metal halide is defined as a metal halide in which the metal has a valence less than its maximum. Depending upon the materials used in preparation of the complex and the method of preparation, the complex may contain, in addition to the aforesaid reduced metal halide, divalent metal halide and aluminum compounds, other groups such as hydroxyl, alcoholate, hydrocarbyl, carboxylate, halocarboxylate, phosphorus acid ester, inorganic oxyacid and/or carbonate.

The precise chemical structure of the supported complex is not known at present though it appears that the manner in which the constituents of the complex are associated involves more than a simple physical mixture because on combination of the components used in preparing the complex, reaction takes place and changes in particle size and color are observed. Further, extensive washing with typical hydrocarbon solvents, e.g., the alkanes, does not serve to completely remove the various metal compounds present in the complex. For purposes hereof, the term "intimate association" is used to define such an association.

Preferably, the high activity supported complex comprises about 2 to about 25 wt.% divalent metal, about 4 to about 35 wt.% reduced Group IVB and/or VB metal, about 40 to about 80 wt.% halogen and about 2 to about 25 wt.% aluminum. Aluminum content depends largely on the extent of washing to which the complex is subjected. More preferably, the complex comprises about 6 to about 20 wt.% magnesium, about 7 to about 25 wt.% reduced titanium or reduced titanium in combination with reduced vanadium and/or zirconium, about 50 to about 70 wt.% chlorine and about 2 to about 15 wt.% aluminum.

The supported catalytic complex is prepared by reaction of components comprising at least one higher valent Group IVB or VB metal compound, a support material comprising at least one catalytically inert divalent metal compound and at least one organoaluminum compound corresponding to the formula $AlR_nX_{3-n}$, wherein R is hydrocarbyl, X is halogen and $0<n\leq 3$, in amounts and under conditions effective to yield the above-described supported catalytic complex.

In greater detail, higher valent Group IVB or VB metal components useful in preparation of the supported complex include compounds capable of being converted to reduced halides on reaction with support material and organoaluminum component. For purposes hereof, higher valent is defined as the +4 oxidation state with respect to the Group IVB metals and the +3, +4 and +5 states with respect to the Group VB metals. Such materials are well known to persons skilled in the art, a number of specific examples being found in the above-referenced patents.

From the standpoint of catalytic activity, preferred Group IVB-VB metal compounds are the titanium(IV) chlorides, alkoxides and alkoxychlorides in which the alkoxy groups contain 1 to about 8 carbon atoms. Polymeric organic titanates containing 1 to about 8 carbon atoms per organic group also give desirable results. Best results are attained with $TiCl_4$, $Ti(OC_4H_9)_4$ and mixtures thereof. From the standpoint of obtaining polyolefin products having broad molecular weight distributions, mixtures of the aforesaid titanium(IV) compounds with zirconium(IV) and/or vanadium(III), (IV) and/or (V) chlorides, alkoxides, alkoxychlorides, oxychlorides, oxyalkoxides and/or oxyalkoxychlorides are preferred.

Useful support materials are those that comprise at least one catalytically inert, divalent metal compound capable of reacting with the other preparative components to form divalent metal halides. Useful divalent metals include those of Groups IB, II, IVA, VIIB and VIII such as Cu, Mg, Ca, Zn, Cd, Si, Sn, Mn, Fe and Co. Compounds of magnesium give best results in terms of catalyst performance although compounds of manganese and iron also give desirable results. Compounds of the remaining divalent metals can be used in preparation of active supported catalytic complexes although the preferred use of such compounds is in combination with a magnesium, manganese(II) or iron(II) compound as catalyst complexes free of the latter are of limited practical value.

Useful compounds of the aforesaid metals include a wide range of materials known to persons skilled in the art. Examples include hydroxides, halides, hydroxyhalides, hydrocarbyls, alcoholates, carboxylates, halocarboxylates, oximates, inorganic oxyacid salts (e.g., phosphates, sulfates), oxides, carbonates and phosphorus acid ester salts. Such compounds preferably are substantially anhydrous although a small amount of water typically can be tolerated. Representative support materials include $Mg(OH)_2$, $MgCl_2$, $Mg(OH)Cl$, $Mg(C_2H_5)_2$, $Mg(C_2H_5)Cl$, $Mg(OC_2H_5)_2$, $Mg(OCCH_3)_2$, -continued $Mg(OCCCl_3)_2$, $Mg_3(PO_4)_2$, $MgSO_4$, $MgCO_3$, $MgO$, $MgS$, $Mg[OP(OC_2H_5)_2]_2$, $Mg[OP(OC_2H_5)H]_2$ and $Mg[OP(C_2H_5)(OC_2H_5)]_2$.

Preferred support materials are magnesium oxide chloride, alkoxides and dialkylphosphates containing 1 to about 6 carbon atoms per alkoxy or alkyl group. Best improvements in polymer particle size are attained with respect to complexes wherein the support material is a magnesium alkoxide, particularly magnesium ethylate.

Organoaluminum compounds employed in preparation of the above-described supported catalyst complexes are materials corresponding to the formula $AlR_nX_{3-n}$, wherein R is hydrocarbyl, X is halogen, and $0<n\leq 3$. Specific examples of such compounds are given in the above-referenced patents. Preferably, R in the formula is a $C_{1-6}$ alkyl, X is chlorine and n ranges from about 1 to about 2.5. Diethylaluminum chloride, ethylaluminum dichloride and mixtures thereof are the most preferred organoaluminum halides.

To prepare the supported catalytic complex used according to the invention, the above-described components are reacted in amounts and under conditions effective to yield a catalytic complex comprising an intimate association of reduced Group IVB and/or VB metal halide, divalent metal halide and one or more compounds of aluminum. Preferably, starting materials are used in amounts such that the atomic ratio of Group IVB and/or VB metal to divalent metal in the support material ranges from about 0.01:1 to about 100:1 and the atomic ratio of aluminum in the organoaluminum component to divalent metal ranges from about 1:1 to about 25:1. More preferably, the ratio of Group IVB and/or VB metal to divalent metal is about 0.1:1 to about 20:1 and the aluminum to divalent metal ratio is about 2:1 to about 15:1, especially about 3:1 to about 10:1. In addition, reactants and reactant concentrations should be selected such that the preparative system contains sufficient halogen to yield an active catalyst component as can be determined by persons skilled in the art from the examples appearing hereinbelow and the above-referenced patents.

The catalyst complex preparation preferably is conducted in an inert hydrocarbon or halogenated hydrocarbon solvent for one or more of the above-described components at temperatures ranging from about 0° to about 200° C. and in the substantial absence of water, oxygen, carbon oxides and other extraneous catalyst poisons. The sequence of combining the components is not critical, although it is preferred to avoid contacting the Group IVB and/or VB metal component and organoaluminum halide in the absence of support material as an undesirable reduction of the Group IVB and/or VB metal may take place. The preferred sequence is to combine the Group IVB and/or VB metal component and support material in a first step and then add organoaluminum component, most preferably dissolved in a solvent, to the resulting solution or mixture. During addition of organoaluminum component it is desirable to agitate the reaction mixture to attain optimum morphological properties with respect to the catalyst complex. Preferably, agitation is sufficient to achieve complete suspension of solids present during the preparation, though not so vigorous that substantial attrition of solids takes place. Preferably, agitation is at a low enough rate that no more than about 10 wt.% of the complex has a particle size less than about 5 microns. Further details with respect to preparation of the supported complex are found in the above-referenced patents.

The result of the above-described preparation typically is a finely-divided solid that can be treated as is or suspended in a diluent or washed and/or dried prior to treatment according to the present invention. Preferably, unreacted starting materials and soluble reaction products such as excess Group IVB or VB component and organoaluminum compound are removed from the complex, e.g., by washing with a suitable solvent such as hexane, prior to treatment with nitro compound.

According to the present invention, the above-described supported catalytic complex is modified by reaction with at least one hydrocarbon-soluble aromatic nitro compound in an amount effective to improve polymer morphology without substantial adverse effects on polymerization performance.

Useful aromatic nitro compounds are hydrocarbon-soluble materials corresponding to the general formula $Ar(NO_2)_x$, wherein Ar is a substituted or unsubstituted aromatic group and x is at least 1. In the case of substituted aromatic groups Ar, the substituents may be polar or nonpolar although polar substituents typically reduce hydrocarbon solubility and therefore are less preferred. Compounds in which a nitro group is bonded directly to the aromatic ring (e.g., as in nitrobenzene) as well as those wherein the nitro group is bonded to the ring via a substituent (e.g., as in alpha-nitro toluene) and compounds containing combinations of such linkages are contemplated. For purposes hereof, hydrocarbon solubility is defined as at least slight solubility in benzene in accordance with CRC, *Handbook of Chemistry and Physics*, 50th ed. (1969–70).

Specific examples of useful aromatic nitro compounds include nitrobenzene, 1-ethyl-2-nitrobenzene, 1,2,4-trinitrobenzene, 1-methoxy-2,4,5-trinitrobenzene, alpha-nitrotoluene, 3-nitrotoluene, 4-nitrotoluene, dinitroxylenes, 4,4'-dinitrobiphenyl, 1-nitronaphthalene and 1-hydroxy-8-nitronaphthalene. Mixtures of nitro compounds can be used if desired.

The preferred nitro compounds are the unsubstituted and mono- and dimethyl-substituted mononitrobenzenes. More preferably, the nitro compound is nitrobenzene, 3-nitrotoluene, 4-nitrotoluene or a mixture thereof. Nitrobenzene gives best results owing to its combination of relatively high solubility in preferred solvents such as hexane and nonane and its beneficial effect on polymer morphology.

The aromatic nitro compound is employed in an amount that is effective to improve polymer morphology without substantial adverse effects on other catalytic properties such as activity and polymer rheology. Preferably, the nitro compound is employed in an amount ranging from about 0.01 to about 5 moles per mole of aluminum compounds present in the supported catalyst complex. More preferably, the amount ranges from about 0.1 to about 1 mole nitro compound per mole aluminum compounds in order to attain desirable improvements in polymer morphology while minimizing effects on other catalytic properties. The concentration of aluminum compounds present in the complex prior to modification can be determined by routine analysis for aluminum.

Supported catalytic complex and aromatic nitro compound are contacted under conditions effective to yield the desired improvement in terms of polymer morphology without substantial adverse effects on other catalytic properties. Preferably, contacting is conducted at temperatures ranging from about $-10°$ to about $140°$ C., and more preferably about $10°$ to about $80°$ C. Treatment time is sufficiently long to ensure thorough contacting; agglomeration of treated catalyst complex particles serving as a convenient indicator of the progress of the contacting. Preferred times range from about $\frac{1}{2}$ to about 10 hours with about 1 to about 3 hours being more preferred. Contacting is conducted in an inert hydrocarbon or halohydrocarbon solvent for the nitro compound that is inert with respect to the catalytic complex and remains in the liquid state at contacting temperatures or can be maintained in the liquid state through the use of elevated pressures. Preferred solvents include hexane, nonane and benzene, although a wide range of other alkanes as well as various aromatics and halogenated and hydrogenated aromatics also can be used. Specific examples of the latter include diethylbenzenes, o-dichlorobenzene, tetrahydronaphthalene and decahydronaphthalene. Preferably, the solvent is purified prior to use, for example, by passage over molecular sieves or silica, and/or by contact with materials capable of scavenging impurities.

Treatment with nitro compound is conducted in the substantial absence of water, oxygen, carbon oxides and other extraneous catalyst poisons. Such poisons are conveniently excluded by conducting the aromatic nitro compound treatment in an inert atmosphere, for example, under a nitrogen blanket.

Following contacting of the nitro compound and the supported catalytic complex, the result, which is in the form of a solid having a slight tendency toward further agglomeration, preferably is separated from excess nitro compound, such as by decantation, filtration or centrifugation. Preferably, the solid then is washed to further remove traces of unreacted nitro compound which, when present in excess, can harm ultimate catalyst performance. Subsequently, the resultant solid can be used in polymerization as is or suspended in a diluent prior to such use.

For polymerization use, the nitro compound-modified supported complex is combined with organometallic promoter, the latter being employed in an amount that is effective to promote the polymerization activity of the modified supported complex.

Promoters useful according to this invention include any of the materials commonly known as co-catalysts or promoters for alpha-olefin polymerization catalyst components containing compounds of the Group IVB-VIB metals. Examples of such promoters include Group IA, IIA, IIB, IIIA and IVA metal hydrides and the organometallics containing at least one hydrocarbyl group bonded to metal. Preferred promoters are the metal alkyls, alkylhydrides and alkylhalides, such as alkyllithium compounds, dialkylzinc compounds, trialkylboron compounds, trialkylaluminum compounds, alkylaluminum halides and hydrides. Mixtures also can be employed.

Specific examples of useful promoters include lithium hydride, lithium-aluminum hydride, sodium borohydride, n-butyllithium, diethylzinc, di-n-propylzinc, triethylboron, triethylaluminum, triisobutylaluminum, tri-n-hexylaluminum, diethylaluminum chloride, bromide, and hydride, di-n-propylaluminum chloride, bromide, and hydride, diisobutylaluminum chloride, bromide, and hydride, triethylgallium and tetraethyl lead.

Promoters that are preferred for use according to this invention are the Group IIIA metal alkyls and dialkylhydrides having 1 to about 20 carbon atoms per alkyl radical. More preferably, the promoter is a trialkylaluminum compound having 1 to about 6 carbon atoms per alkyl radical such as trimethyl-, triethyl-, tri-n-propyl-, triisobutyl-, tri-n-pentyl-, and tri-n-hexylaluminum. Most preferably, the promoter is triethylaluminum or triisobutylaluminum.

The promoter is employed in at least an amount that is effective to promote the polymerization activity of the nitro compound-modified supported complex. Preferably, at least about 1 part by weight of promoter is employed per part by weight of treated supported complex, although higher ratios, such as 10:1, 25:1, 100:1 or higher also are suitable and often give highly beneficial results, particularly when a portion of the promoter is employed to pretreat the polymerization medium used in processes using such a medium.

Prior to combining the treated supported catalyst complex of this invention with a promoter, it also is contemplated to temporarily and reversibly deactivate the treated complex by contacting the same with a suitable deactivating agent in accordance with U.S. Pat. No. 4,130,699 (Hoff et al.). Deactivating agents that are preferred for use with the modified supported catalyst components of this invention are hydrogen halides and lower aliphatic alcohols, with anhydrous hydrogen chloride and ethanol being most preferred.

According to the invention, the above-described catalysts are employed in known alpha-olefin polymerization processes wherein at least one polymerizable alpha-olefin is contacted with the catalyst under polymerizing conditions. Typical solution, bulk, and gas phase processes are contemplated herein. Suitable alpha-olefins include ethylene, propylene, butene-1, pentene-1, 4-methylpentene-1, hexene-1, and mixtures thereof. Preferably, the invented catalysts are employed in the polymerization of ethylene or mixtures of ethylene with up to about 20 mole % of one or more higher alpha-olefins.

The conditions under which the invented catalysts are employed in the polymerization of alpha-olefins are well known to persons of skill in the art and described in detail in the patents incorporated herein by reference.

Through the use of the invented catalysts there are obtained polyolefins, having molecular weights typically ranging from about 50,000 to about 3,000,000, in sufficiently high yields, relative to the amount of catalyst employed, that useful polymeric products are obtained without the need for separation of catalyst residues. The polymers exhibit sufficiently broad molecular weight distributions as to be processable by a variety of techniques such as extrusion, mechanical melting, casting, and molding. In particle form and gas phase processes, average polymer particle size typically ranges from about 200 to about 500 microns and levels of fine particles (i.e., less than 150 microns) typically are below about 20 wt.%.

The following examples illustrate the present invention and are not to be construed as limiting the scope thereof.

EXAMPLE I (A) To a 500 ml round bottom flask maintained under nitrogen were added 128.6 g magnesium ethylate followed by 156 ml tetrabutyl titanate (TBT) and 100 ml nonane. The resulting mixture was heated at 150° C. for four hours during which time the magnesium ethylate dissolved. Following heating, the liquid was cooled and hexane was added in an amount sufficient to give a total volume of 910 ml. 50 ml of this mixture and 90 ml hexane then were added to a 300 ml round bottom flask equipped with mechanical stirrer, inert gas inlet and dropping funnel. The solution was stirred at 100 rpm and during stirring 92 ml of a 3.37 M solution of ethylaluminum dichloride (EADC) in hexane were added over a period of 105 minutes. Following completion of addition of the EADC solution, stirring was continued for 30 minutes. As a result there was obtained a finely-divided, solid, supported catalytic complex suspended in the liquid phase. The next day, 0.85 ml of the stirred suspension was removed from the flask and diluted with 50 ml hexane. This sample, identified as (A), was employed in polymerization according to (D).

(B) Following removal of the 0.85 ml sample, the remainder of the suspension of catalytic complex was allowed to settle overnight after which 157 ml of the clear supernatant were removed and replaced with 220 ml hexane. The resultant mixture then was stirred about five minutes and again allowed to settle. After the solid had settled, 117 ml supernatant were removed and 7 ml hexane were added to the mixture. Subsequently, a mixture of 10 ml (0.097 mole) nitrobenzene and 15 ml hexane was added over a 15-minute period during which heat and a gas evolved. Following completion of the nitrobenzene addition, the product was darker in appearance than the starting complex and the particles of the product were larger than those of the starting complex. A 0.6 ml portion of the stirred suspension was removed and diluted with 50 ml hexane. This treated catalyst complex, identified as (B), was employed in polymerization according to (D).

(C) To a 300 ml round bottom flask equipped with mechanical stirrer and nitrogen inlet were added 50 ml of the TBT-magnesium ethylate mixture prepared in (A) and 80 ml hexane. A solution prepared from 10 ml (0.097 mole) nitrobenzene and 15 ml hexane was added to the result over 10 minutes with stirring. Stirring was continued for 50 minutes after completion of the addition of the nitrobenzene solution. Appearance of the TBT-magnesium ethylate-hexane mixture remained unchanged after addition of nitrobenzene solution and stirring.

The above mixture was allowed to stand overnight, its appearance remaining unchanged. Addition of an additional 10 ml nitrobenzene and 15 ml hexane had no effect.

Subsequently, 3.37 M EADC in hexane was added dropwise with stirring. When 5 ml had been added a precipitate was present and some small black particles formed. When 18 ml had been added the reaction mixture took on a dark, pea green color. At 75 ml EADC solution, there resulted sludge that could not be stirred.

From this preparation it can be seen that addition of nitro compound prior to organoaluminum component can result in inadequate control over the modifier and undesirable agglomeration.

(D) A series of ethylene polymerizations was conducted according to the following procedure. Samples of the catalyst component slurries prepared in (A) and (B), and 80 mg triethylaluminum were stirred in about 250 ml hexane in a purged, 500 ml stainless-steel autoclave reactor. The reactor was charged with hydrogen to the pressures specified in Table 1 after which the reactor was charged with ethylene to 300 psig. During polymerization, ethylene was charged as needed to maintain a total pressure of 300 psig. Polymerization was conducted at 85° C. over a period of one hour after which the reactor was opened and the contents thereof filtered. The resulting solid white polyethylene was dried overnight (about 16 hours) at 25° C. and then weighed. Melt indices (MI) were determined according to ASTM D-1238 Condition E. Inherent viscosities (IV) were determined according to ASTM D-1601. Particle size distribution was determined by placing the entire product from each run on the top screen of a stack of full height sieves (U.S.A. Standard Testing Sieves Nos. 20, 40, 60, 80 and 100, designated 850 microns, 425 microns, 250 microns, 180 microns and 150 microns, respectively) and a pan, after which a cover was placed on the top sieve and the assembly was shaken for 10 minutes on a Tyler Portable Sieve Shaker (motor speed=500 rpm). Polymerization conditions and results are reported in Table 1 and particle size distribution in Table 2.

TABLE 1

| POLYMERIZATION CONDITIONS AND RESULTS | | | | | |
|---|---|---|---|---|---|
| CATALYST SAMPLE | AMOUNT (mg) | H$_2$ (psig) | YIELD[1] (g) | MI (dg/min) | IV |
| (A) | 0.91 | 50 | 49.4 | 0.64 | 2.18 |
| (A) | 1.4 | 90 | 46.4 | 10.0 | [2] |
| (B) | 1.1 | 55 | 41.5 | 0.67 | 2.17 |
| (B) | 1.65 | 90 | 32.6 | 4.7 | 1.46 |

[1]Calculated on the basis of equivalent amounts of TiCl$_3$ and MgCl$_2$, these yields correspond to activities of 54,300, 33,100, 37,700, and 19,800 grams polyethylene per gram supported catalyst component per hour respectively.
[2]Not determined.

TABLE 2

| | PARTICLE SIZE DISTRIBUTION | | | | | | |
|---|---|---|---|---|---|---|---|
| CATA-LYST | WT. % OF PRODUCT RETAINED ON SIEVE (μ) | | | | | | APS[1] |
| SAMPLE | 850 | 425 | 250 | 180 | 150 | PAN | (μ) |
| (A) | 2.8 | 24.1 | 28.6 | 9.2 | 8.5 | 26.8 | 270 |
| (A) | 3.0 | 25.2 | 29.7 | 7.3 | 8.2 | 26.6 | 270 |
| (B) | 9.7 | 33.1 | 28.1 | 7.2 | 6.0 | 15.9 | 370 |
| (B) | 7.7 | 27.8 | 31.3 | 6.7 | 8.0 | 18.5 | 320 |

[1]APS stands for Average Particle Size.

From Table 1 it can be seen that modification of a supported catalytic complex with nitrobenzene did decrease catalytic activity somewhat, though activity still was well in excess of that required to eliminate the need for removal of catalyst residues from the polymeric product. Modification also affected hydrogen sensitivity of the supported catalyst complex as can be seen by comparison of the extent of increase in MI at 50-55 psig hydrogen versus 90 psig hydrogen. Referring to Table 2, it can be seen that the effect of modification with nitrobenzene on morphology was to increase the average particle size of the polymer by 50-100 microns and to reduce by about 10 wt.% the level of polymer having a particle size less than 150 microns. That size typically is regarded as "fine" and is undesirable from the standpoint of commercial polymerization operations. It also can be seen from Table 2 that particle size distribution was narrowed somewhat in that the modified catalyst component gave about 65-70 wt.% polymer with particle size greater than 250 microns while only about 55-60 wt.% was within this size range for the unmodified complex.

COMPARATIVE EXAMPLE (A) To a 500 ml round bottom flask equipped as in Example IA was added 59 g magnesium ethylate, 70 ml TBT and 40 ml nonane. The mixture was stirred and heated to about 150° C. for a time sufficient to dissolve the magnesium ethylate after which the solution was allowed to cool to about 20°-30° C. To the cooled solution was added sufficient hexane to give a total volume of 600 ml.

200 ml of the TBT-magnesium ethylate product was syringed into a round bottom flask equipped as in I(A) and 250 ml 3.4 M EADC in hexane were added dropwise over about 2¼ hours. The stirring speed was about 250 rpm. During addition a brown precipitate formed. To a 500 ml round bottom flask equipped as in Example I(A) were added a 178 ml sample of the resulting suspension and 250 ml hexane. The result was stirred briefly and then the solid was allowed to settle. 320 ml supernatant were removed and 200 ml hexane added. A 1.2 ml sample of the result, identified as (A), was removed, diluted with 60 ml hexane and employed in polymerization of ethylene according to the procedure of Example I(D).

(B) To the slurry remaining after sampling in (A) were added 1.6 ml nitromethane such that the nitromethane to aluminum molar ratio was 0.35. During addition, the solid became yellow-brown in color and some large particles were observed. Some of the solid product appeared to be stuck to the bottom of the flask. A 3.2 ml sample of the suspension, identified as (B), was removed, diluted with 50 ml hexane and employed in ethylene polymerization according to the procedure of Example I(D).

(C) A 2.5 ml sample was removed from the slurry remaining after sampling in (B) and diluted with 50 ml hexane. This sample, identified as (C), appeared less yellow and more brown than (A) or (B). Polymerization of ethylene was conducted according to the procedure of Example I(D).

For polymerization runs using catalyst complexes (A)-(C), conditions and results are reported in Table 3 and particle size distribution in Table 4.

TABLE 3

| POLYMERIZATION CONDITIONS AND RESULTS | | | | | |
|---|---|---|---|---|---|
| CATALYST SAMPLE | AMOUNT (mg) | H$_2$ (psig) | YIELD (g) | MI (dg/min) | ACTIVITY[1] |
| (A) | 1.07 | 50 | 50.6 | 0.94 | 47,000 |
| (B) | 1.50 | 50 | 59.5 | 1.1 | 40,000 |
| (C) | 1.53 | 45 | 65.2 | 0.94 | 43,000 |
| (C) | 2.38 | 70 | 58.2 | 4.8 | 24,000 |

[1]Activity is reported in g polyethylene per gram catalyst complex (calculated as TiCl$_3$ plus MgCl$_2$) per hour.

TABLE 4

| | PARTICLE SIZE DISTRIBUTIONS | | | | | | |
|---|---|---|---|---|---|---|---|
| CATA-LYST | WT. % OF PRODUCT RETAINED ON SIEVE (μ) | | | | | | APS |
| SAMPLE | 850 | 425 | 250 | 180 | 150 | PAN | (μ) |
| (A) | 9.6 | 30.1 | 36.5 | 10.0 | 5.1 | 8.6 | 360 |
| (B) | 14.4 | 25.9 | 20.5 | 7.6 | 7.8 | 15.8 | 350 |
| (C) (1) | 22.6 | 27.9 | 25.3 | 5.6 | 4.5 | 14.2 | 425 |

TABLE 4-continued

| CATALYST SAMPLE | PARTICLE SIZE DISTRIBUTIONS | | | | | | APS ($\mu$) |
|---|---|---|---|---|---|---|---|
| | WT. % OF PRODUCT RETAINED ON SIEVE ($\mu$) | | | | | | |
| | 850 | 425 | 250 | 180 | 150 | PAN | |
| (C) (2) | 15.2 | 26.0 | 27.0 | 8.4 | 3.2 | 20.2 | 350 |

From the tables it can be seen that nitromethane did not adversely affect average particle size but fines (i.e., particles smaller than 150 microns) increased from less than 10 wt.% to about 15-20 wt.%. Thus, it can be seen that the overall effect of nitromethane was inferior to that of nitrobenzene.

In connection with this example, it should be noted that the product from the run using unmodified catalyst (A) had a comparable or greater average particle size and a lower level of fines than the produces from the runs employing the nitrobenzene-modified complex of Example I(B). This difference can be attributed to the greater stirring speed in this example.

I claim:

1. In a catalyst composition comprising an organometallic promoter and a supported catalyst complex comprising an intimate association of at least one reduced Group IVB or VB metal halide, at least one divalent metal halide and at least one compound of aluminum the improvement of contacting said supported catalyst complex with at least one hydrocarbon-soluble aromatic nitro compound in an amount and under conditions effective to improve polymer morphology.

2. The catalyst composition of claim 1 wherein the aromatic nitro compound is at least one unsubstituted or mono- or dimethyl-substituted mononitrobenzene.

3. The catalyst composition of claim 2 wherein the supported catalyst complex comprises an intimate association of reduced titanium chlorides, magnesium chloride and at least one aluminum compound wherein the titanium content ranges from about 6 to about 20 wt.%, magnesium content ranges from about 7 to about 25 wt.%, aluminum content ranges from about 2 to about 15 wt.% and chlorine content ranges from about 50 to about 70 wt.%.

4. The catalyst composition of claim 3 wherein the aromatic nitro compound is nitrobenzene.

5. A catalyst composition comprising an organometallic promoter and a component prepared by contacting (A) a reaction product of components comprising (1) at least one higher valent Group IVB or VB metal compound, (2) a support material comprising at least one catalytically inert divalent metal compound and (3) at least one organoaluminum compound corresponding to the formula $AlR_nX_{3-n}$, wherein R is hydrocarbyl, X is halogen and $0 < n \leq 3$, with (B) at least one hydrocarbon-soluble aromatic nitro compound in an amount effective to improve polymer morphology.

6. The catalyst composition of claim 5 wherein (B) is at least one unsubstituted or mono- or dimethyl-substituted mononitrobenzene.

7. The catalyst of claim 6 wherein (A) (2) comprises at least one magnesium compound selected from the group consisting of the chloride, oxide, alkoxide and dialkyl phosphates containing 1 to about 6 carbon atoms per alkoxy or alkyl group.

8. The catalyst composition of claim 7 wherein (A) (1) is a titanium (IV) chloride, alkoxide or alkoxychloride containing 1 to about 8 carbons per alkoxy group or a combination of said titanium (IV) compound with at least one zirconium (IV) or vanadium (III), (IV) or (V) chloride, alkoxide, alkoxychloride, oxychloride, oxyalkoxide or oxyalkoxychloride containing 1 to about 8 carbons per alkoxy group.

9. The catalyst composition of claim 8 wherein (A) (3) comprises at least one compound corresponding to the formula $AlR_nX_{3-n}$, wherein R is alkyl of 1 to about 6 carbons, X is chlorine and $0 < n \leq 3$.

10. The catalyst composition of claim 9 wherein (B) is nitrobenzene.

11. The catalyst composition of claim 10 wherein (A) (1) comprises $TiCl_4$, $Ti(OC_4H_9)_4$ or a mixture thereof, (A) (2) comprises $Mg(OC_2H_5)_2$ and (A) (3) comprises $Al(C_2H_5)_2Cl$, $Al(C_2H_5)Cl_2$ or a mixture thereof.

* * * * *